(12) United States Patent
Kim

(10) Patent No.: US 11,823,571 B2
(45) Date of Patent: Nov. 21, 2023

(54) DEVICE AND METHOD FOR PREDICTING TRAFFIC INFORMATION

(71) Applicants: HYUNDAI MOTOR COMPANY, Seoul (KR); KIA CORPORATION, Seoul (KR)

(72) Inventor: Tae Heon Kim, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 172 days.

(21) Appl. No.: 17/362,569

(22) Filed: Jun. 29, 2021

(65) Prior Publication Data

US 2022/0130239 A1 Apr. 28, 2022

(30) Foreign Application Priority Data

Oct. 26, 2020 (KR) .......................... 10-2020-0139673

(51) Int. Cl.
*G08G 1/052* (2006.01)
*G08G 1/01* (2006.01)
*G06N 3/08* (2023.01)

(52) U.S. Cl.
CPC ........... *G08G 1/052* (2013.01); *G08G 1/0104* (2013.01); *G06N 3/08* (2013.01)

(58) Field of Classification Search
CPC ......... G08G 1/052; G08G 1/0104; G06N 3/08
See application file for complete search history.

(56) References Cited

U.S. PATENT DOCUMENTS

| | | | |
|---|---|---|---|
| 9,633,560 B1 * | 4/2017 | Gao | G08G 1/07 |
| 2014/0236449 A1 * | 8/2014 | Horn | B60W 30/16 |
| | | | 701/96 |
| 2014/0358413 A1 * | 12/2014 | Trombley | G06G 1/00 |
| | | | 701/118 |
| 2018/0043935 A1 * | 2/2018 | Hashimoto | G08G 1/20 |
| 2019/0236952 A1 * | 8/2019 | Suzuki | G08G 1/0133 |
| 2019/0382021 A1 * | 12/2019 | Niibo | B60W 10/20 |
| 2020/0108824 A1 * | 4/2020 | Bettger | G01S 19/13 |
| 2020/0180641 A1 * | 6/2020 | Hashimoto | G06V 20/588 |
| 2021/0188264 A1 * | 6/2021 | Okuda | G08G 1/096725 |
| 2022/0130239 A1 * | 4/2022 | Kim | G08G 1/052 |
| 2022/0289248 A1 * | 9/2022 | Niewiadomski | B60W 50/0098 |
| 2023/0020966 A1 * | 1/2023 | Foster | G06V 20/588 |
| 2023/0040881 A1 * | 2/2023 | Yamada | B60W 50/14 |

OTHER PUBLICATIONS

Hayon, Dr. Gaby "Mobileye Sensing Status and Road Map" Nov. 2019 (49 pages).

* cited by examiner

*Primary Examiner* — Hoi C Lau
(74) *Attorney, Agent, or Firm* — MORGAN, LEWIS & BOCKIUS LLP

(57) ABSTRACT

A device and a method for predicting traffic information are provided. The traffic information predicting device may include a data calculating device configured to derive inter-vehicle spacings, inter-vehicle head spacings, and a vehicle density using a plurality of sensors mounted on a vehicle, and a predicting device configured to derive travel speed data corresponding to the vehicle density and predict traffic information.

18 Claims, 11 Drawing Sheets

DEVICE AND METHOD FOR PREDICTING TRAFFIC INFORMATION

CROSS-REFERENCE TO RELATED APPLICATION

The present application claims the priority to and the benefit of Korean Patent Application No. 10-2020-0139673, filed on Oct. 26, 2020, the entire contents of which are incorporated herein by reference.

TECHNICAL FIELD

The present disclosure relates to a device and a method for predicting traffic information, and more particularly, to a device and a method for predicting traffic information based on a density estimation technology.

BACKGROUND

Traffic information currently being provided corresponds to information predicted based on a past pattern speed. That is, based on assumption that a similar speed will be generated during the same time zone of the day, current traffic information, for example speed information, is derived using an existing speed pattern.

In a case of utilizing traffic information on the same day of the week and the same time zone in the past, a speed on Monday, March 2, AM 9:00 to 9:05 is predicted using, for example, a speed on Monday, February 3, AM 9:00 to 9:05 and a speed on Monday, February 10, AM 9:00 to 9:05.

However, in a speed based on the past pattern, exceptional characteristics that may appear at a corresponding time point, for example, variables such as weather, season, or the like may change differently, and a volume of traffic may vary by time, so that inappropriate data resulted therefrom is utilized for the speed prediction. That is, the assumption that the similar speed will be maintained during the same time zone is likely to increase a probability of occurrence of an error when predicting the traffic information.

In one example, a study on whether a change in an amount of operation of a vehicle probe (hereinafter, referred to as a probe) affects traffic is also being conducted to predict the traffic information. In this case, a congestion time may be predicted macroscopically based on a GPS occurrence time point, but due to a limit on the number of probe samples, there is a limit in prediction in a microscopic aspect such as speed prediction for each time zone of link units (roads subject to the prediction).

Therefore, when using the past pattern speed, it may be desirable to utilize a speed in a similar traffic condition, rather than a simple speed in the same time zone. In one example, a density corresponding to a vehicle density is known as an effective measure for the most objective determination of the traffic condition in traffic engineering.

A study related to density estimation has an advantage of capturing an image of a limited section of the road to calculate the average number of vehicles in the corresponding section and identifying the total number of vehicles on the actual road through the image capturing, but there is a limit in securing data when constant density data is required like traffic prediction.

Therefore, it may be desirable to secure an additional variable that may be utilized for the speed prediction, and to develop a travel speed predicting technique based on the density.

SUMMARY

An aspect of the present disclosure provides a device and a method for predicting traffic information capable of objectively determining a traffic condition through inter-vehicle spacing data between vehicles and generating an additional variable (a density) that may be utilized for speed prediction.

Another aspect of the present disclosure provides a device and a method for predicting traffic information capable of reliable density estimation based on a statistical technique.

Another aspect of the present disclosure provides a device and a method for predicting traffic information capable of deriving a travel speed in the same traffic condition by providing a density-based pattern speed.

Another aspect of the present disclosure provides a device and a method for predicting traffic information capable of determining continuity of the traffic condition based on a current density state and developing a prediction model for future traffic information.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for predicting traffic information includes a data calculating device that derives inter-vehicle spacings, inter-vehicle head spacings, and a vehicle density using a plurality of sensors mounted on a vehicle, and a predicting device that derives travel speed data corresponding to the vehicle density and predict the traffic information.

In one implementation, the data calculating device may include an inter-vehicle spacing acquiring device that acquires individual inter-vehicle spacings to a preceding vehicle and a following vehicle from front and rear sensors of the vehicle, an inter-vehicle head spacing calculating device that calculates the inter-vehicle head spacing based on a length of the preceding vehicle or the following vehicle acquired by a camera of the vehicle and the inter-vehicle spacing, and a density calculating device that calculates the vehicle density based on the inter-vehicle head spacing.

In one implementation, the inter-vehicle head spacing calculating device may calculate two inter-vehicle spacing data for three probes from one probe.

In one implementation, the inter-vehicle head spacing calculating device may calculate an inter-vehicle head spacing between the vehicle and the preceding vehicle by adding the inter-vehicle spacing to the preceding vehicle to the vehicle length of the preceding vehicle, and calculate an inter-vehicle head spacing between the vehicle and the following vehicle by adding the inter-vehicle spacing to the following vehicle to a vehicle length of the vehicle.

In one implementation, the density calculating device may estimate an average inter-vehicle head spacing of a population based on N inter-vehicle head spacing samples and calculate a vehicle density of a specific section.

In one implementation, the density calculating device may calculate the vehicle density of the specific section based on Mathematical Formula below.

$$\frac{L}{b} \leq K \leq \frac{L}{a},$$ [Mathematical Formula 1]

where K is the density of the specific section, L is a length of the specific section, a is a minimum value of inter-vehicle head spacings μ of the population, and b is a maximum value of the inter-vehicle head spacing μ of the population.

In one implementation, the predicting device may include a speed deriving device that adds density data about the vehicle density to speed data corresponding to a specific time zone, constructs density-speed pattern data representing at least one speed data corresponding to the vehicle density, and derives a representative speed representing the at least one speed data for each vehicle density.

In one implementation, the predicting device may include a speed predicting device that predicts a vehicle speed of a current time point based on a pre-constructed time-density pattern, a pre-constructed time-speed pattern, and the density-speed pattern data.

In one implementation, the speed predicting device may derive a first vehicle speed corresponding to a first real time density of a first time point not conforming to the time-density pattern based on the density-speed pattern data when a real time density measured in real time does not conform to the time-density pattern, derive a second time point corresponding to the first vehicle speed from the time-speed pattern, and shift the time-speed pattern by a difference between the second time point and the first time point.

In one implementation, the speed predicting device may include an algorithm for performing deep learning modeling determining a relationship between the vehicle density and the vehicle speed.

According to another aspect of the present disclosure, a method for predicting traffic information includes a data calculating operation of deriving inter-vehicle spacings, inter-vehicle head spacings, and a vehicle density using a plurality of sensors mounted on a vehicle, and a traffic information predicting operation of deriving travel speed data corresponding to the vehicle density and predicting the traffic information.

DRAWINGS

The above and other objects, features and advantages of the present disclosure will be more apparent from the following detailed description taken in conjunction with the accompanying drawings.

DETAILED DESCRIPTION

Figure 1:
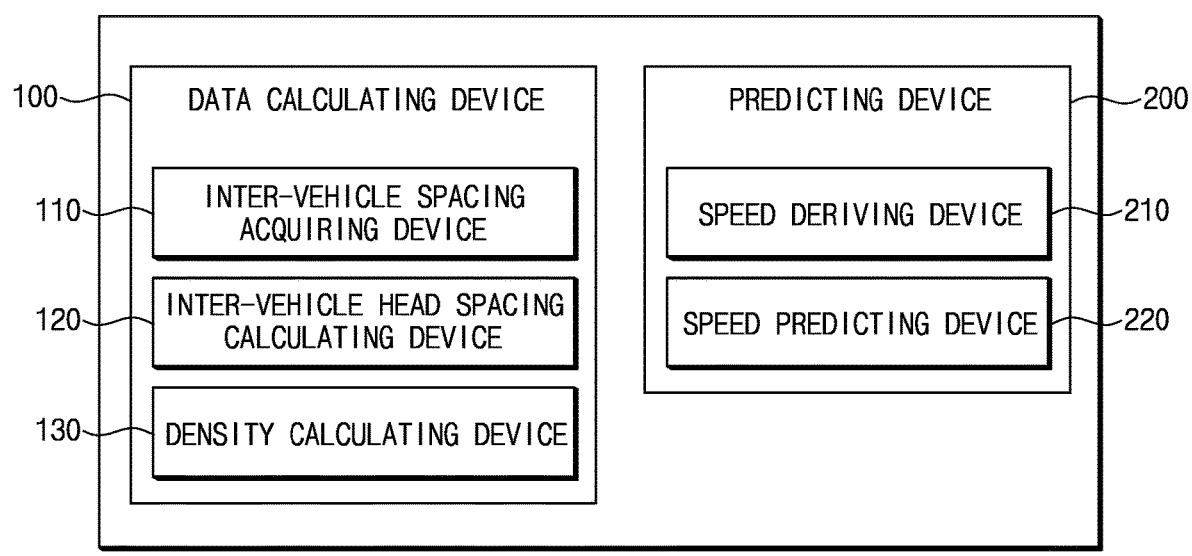
FIG. 1 is a control block diagram of a traffic information predicting device in one form of the present disclosure.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of the related known configuration or function will be omitted when it is determined that it interferes with the understanding of the form of the present disclosure.

In describing some forms of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, forms of the present disclosure will be described in detail with reference to FIGS. 1 to 7.

FIG. 1 is a control block diagram of a traffic information predicting device in some forms of the present disclosure.

As described above, in a case of predicting a speed using a past pattern speed, a traffic environment may change depending on characteristics of each period, and an assumption that a similar speed will be maintained in the same time zone becomes a factor that increases a probability of occurrence of an error. Therefore, in traffic engineering, it is necessary to utilize a density, which is a new variable that may most objectively determine a traffic condition.

A traffic information predicting device according to the present disclosure may estimate a vehicle density based on a vehicle sensing technology and image data, and improve a prediction accuracy of traffic information based on the estimated vehicle density. As shown, the traffic information predicting device in some forms of the present disclosure may include a data calculating device 100 and a predicting device 200 that predicts the traffic information using the information calculated by the data calculating device 100. Such a traffic information predicting device may communicate with sensors of vehicles, cameras attached to interiors or exteriors of the vehicles, and the like, or may communicate with a control module that controls such sensors in a wired or wireless manner. The traffic information predicting device may be implemented as an external server capable of communicating with the vehicle, or may be implemented as a terminal on which an application capable of implementing a prediction method to be described below is executed.

The data calculating device 100 may derive an inter-vehicle spacing, an inter-vehicle head spacing, and the vehicle density using the plurality of sensors mounted on the vehicles, and may include an inter-vehicle spacing acquiring device 110, an inter-vehicle head spacing calculating device 120, and a density calculating device 130 for this purpose.

The predicting device 200 may derive travel speed data corresponding to the vehicle density and predict the traffic information, for example, a speed. To this end, the predicting device 200 may include a speed deriving device 210 and a speed predicting device 220.

Components are functionally distinguished from each other for convenience of description. One or more components may be implemented as one module or chip, and data may be transmitted/received through electronic communication between physical components realizing a function.

Hereinafter, a speed prediction method based on the density will be described with reference to FIGS. 2 to 6.

Figure 2:
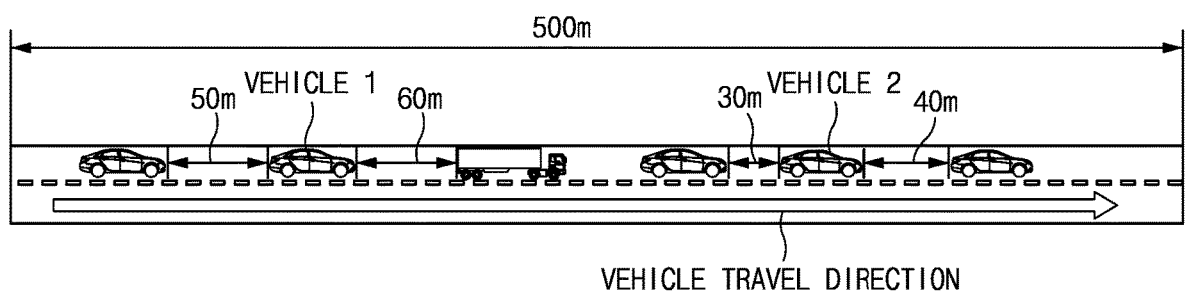
FIG. 2 is a diagram for illustrating an inter-vehicle spacing in one form of the present disclosure.

FIG. 2 is a diagram for illustrating an inter-vehicle spacing in some forms of the present disclosure.

The inter-vehicle spacing acquiring device 110 may acquire individual inter-vehicle spacings to a preceding vehicle and to a following vehicle from front and rear sensors of the vehicle. The inter-vehicle spacing acquiring device 110 may acquire information on the inter-vehicle spacing from the vehicle sensors, and may be implemented as a vehicle sensor itself or a module including the vehicle sensor.

As shown in FIG. 2, in a case of a vehicle 1, an inter-vehicle spacing with a preceding vehicle is 60 m and an inter-vehicle spacing with a following vehicle is 50 m. In a case of a vehicle 2, an inter-vehicle spacing with a preceding vehicle is 40 m and an inter-vehicle spacing with a following vehicle is 30 m.

In some forms of the present form, spacing information from one vehicle, that is, one probe to the preceding vehicle and to the following vehicle may be acquired. That is, states of three vehicles may be identified through one inter-vehicle spacing information. Such inter-vehicle spacing may be used to derive the inter-vehicle head spacing. A vehicle located in the middle of the three vehicles, that is, a vehicle that provides the information on the inter-vehicle spacing, may be referred to as a reference vehicle.

According to another example, the information on the inter-vehicle spacing may be acquired from the vehicle sensor of one of the two vehicles, or the information on the inter-vehicle spacing may be acquired from an individual vehicle. When the inter-vehicle spacing information derived from the plurality of sensors overlap, an average value may be derived as the inter-vehicle spacing.

Figure 3A:
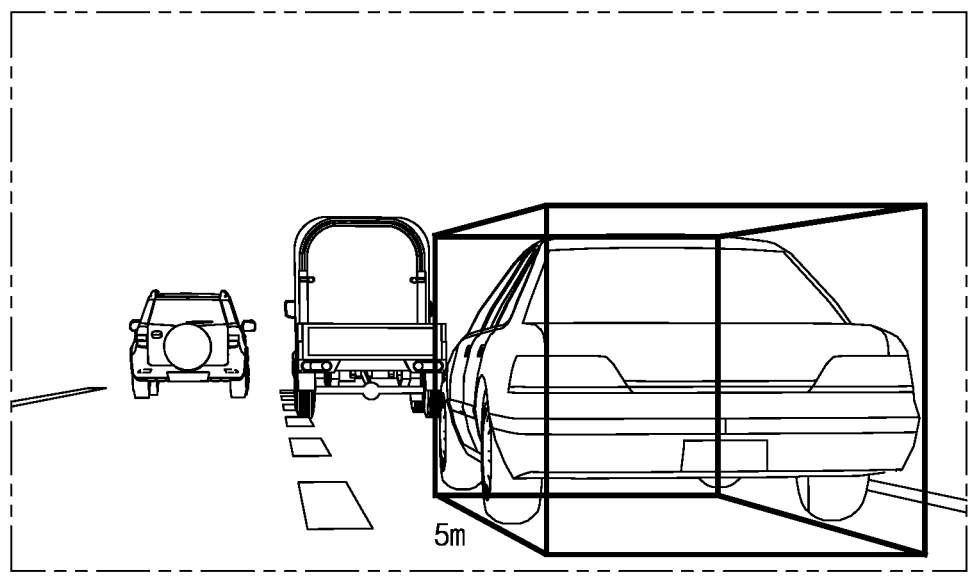
FIGS. 3A and 3B are diagrams for illustrating an inter-vehicle head spacing in one form of the present disclosure.
Figure 3B:
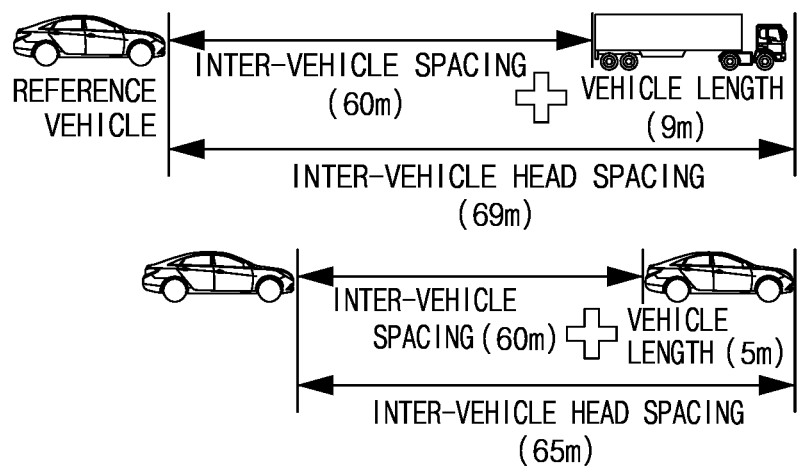

FIGS. 3A and 3B are diagrams for illustrating an inter-vehicle head spacing in some forms of the present disclosure.

The inter-vehicle head spacing calculating device 120 in the data calculating device 100 may calculate the inter-vehicle head spacing based on a length and the inter-vehicle spacing of the preceding vehicle or the following (not shown) vehicle acquired by the camera of the vehicle.

As shown in FIG. 3A, the camera of the vehicle may capture the preceding vehicle, and the camera or the inter-vehicle head spacing calculating device 120 may derive the length of the preceding vehicle or the following vehicle from the captured image.

When the vehicle length of the preceding vehicle is derived as described above, the inter-vehicle head spacing calculating device 120 may derive the inter-vehicle head spacings to the preceding vehicle and to the following vehicle using the inter-vehicle spacing between the reference vehicle and the preceding vehicle and the inter-vehicle spacing between the reference vehicle and the following vehicle.

As shown in FIG. 3B, the inter-vehicle head spacing between the reference vehicle and the preceding vehicle may be derived as a sum of the length of the preceding vehicle or the following vehicle and the inter-vehicle spacing to the preceding vehicle, and the inter-vehicle head spacing between the reference vehicle and the following vehicle may be derived as a sum of a length of the reference vehicle and the inter-vehicle spacing to the following vehicle. The length of the reference vehicle may be default information of the vehicle itself that does not need to be acquired by the sensor. Such inter-vehicle head spacing may be used as direct data for deriving the vehicle density within a specific section.

Also, in the case of the inter-vehicle head spacing, a plurality of information associated with the preceding vehicle and the following vehicle may be acquired using information derived from one reference vehicle. This is obtaining information corresponding to three probes from one probe, so that N(n×2) inter-vehicle head spacing information for n×3 vehicles of population vehicles may be acquired using n probes.

When the inter-vehicle head spacing is calculated as described above, the density calculating device 130 derives the vehicle density based on the inter-vehicle head spacing. The density calculating device 130 estimates a population average inter-vehicle head spacing with N samples of the inter-vehicle head spacings and estimates the vehicle density. The vehicle density may be expressed as a service level or LOS.

When the number of samples of the inter-vehicle head spacings is N, an average of the N inter-vehicle head spacing samples is E(x), and a standard deviation of the N inter-vehicle head spacing samples is s, an average inter-vehicle head spacing μ of the population may be expressed as a statistic T following a t distribution. The statistic T may be expressed in Mathematical Formula, which is as follows.

$$T = \frac{(E(X) - \mu)\sqrt{N-1}}{s}$$ [Mathematical Formula 1]

Figure 4:
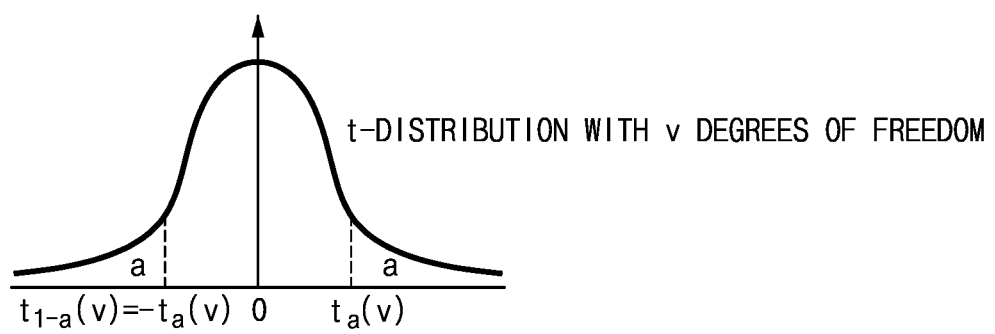
FIG. 4 is a graph illustrating a statistic based on a t distribution according to an example.

Mathematical Formula 1 may be expressed as a graph describing the statistic following the t distribution as shown in FIG. 4.

When a degree of freedom is N−1 and a limit value for a 95% confidence level is α, T may be expressed as Mathematical Formula 2 about α. In this connection, the average inter-vehicle head spacing μ of the population may be expressed as Mathematical Formula 3 having a range of a to b.

$$-\alpha \leq T \leq \alpha$$ [Mathematical Formula 2]

$$a \leq \mu \leq b$$ [Mathematical Formula 3]

When the average inter-vehicle head spacing μ of the population is derived as in Mathematical Formula 3, the density calculating device 130 may derive a density K of a specific section having a specific length.

$$\frac{L}{b} \leq K \leq \frac{L}{a}$$ [Mathematical Formula 4]

L represents the length of the specific section, a represents a minimum value of the average inter-vehicle head spacing μ of the population, and b represents a maximum value of the average inter-vehicle head spacing μ of the population.

When the vehicle density for the specific section is derived as in Mathematical Formula 4, vehicle densities for a plurality of sections may be estimated as shown in a table below. Table 1 shows service levels corresponding to the vehicle densities.

TABLE 1

| | | Design speed 80 kph | |
|---|---|---|---|
| Service level | Density (pcpkmpl) | Traffic volume (pcphpl) | V/c ratio |
| A | ≤6 | ≤500 | ≤0.25 |
| B | ≤10 | ≤800 | ≤0.40 |
| C | ≤14 | ≤1,150 | ≤0.58 |
| D | ≤19 | ≤1,500 | ≤0.75 |
| E | ≤28 | ≤2,000 | ≤1.00 |
| F | >28 | — | — |

Different service levels may be derived corresponding to the vehicle densities, and it may be seen in Table 1 that a traffic volume decreases as the density decreases.

Although a density indicator is the most objective measure for identifying the traffic condition, there was a limit of not being able to be directly collected at a road site. However, in some forms of the present disclosure, the vehicle density may be easily measured in real time based on the inter-vehicle head spacing.

When the vehicle density is estimated as such, the predicting device 200 uses the estimated vehicle density to predict the traffic information, that is, the speed.

To this end, the speed deriving device 210 adds density data about the vehicle density to speed data corresponding to a specific time zone, construct density-speed pattern data representing at least one speed data corresponding to the vehicle density, and derive a representative speed representing the at least one speed data for each vehicle density.

As shown in Table 2, the speed deriving device 210 may generate speed and density data for the same day of the week and the time zone in the past of the specific section.

TABLE 2

| DATA | TIME | V (Km/h) | Density (veh/km) |
|---|---|---|---|
| 12.13 | 08:00:00~08:04:59 | 64 | 14 (Service level C) |
| 12.20 | 08:00:00~08:04:59 | 69 | 14 (Service level C) |
| 12.27 | 08:00:00~08:04:59 | 59 | 19 (Service level D) |
| 01.03 | 08:00:00~08:04:59 | 57 | 19 (Service level D) |
| 01.10 | 08:00:00~08:04:59 | 42 | 25 (Service level E) |
| 01.17 | 08:00:00~08:04:59 | 47 | 25 (Service level E) |
| 01.24 | 08:00:00~08:04:59 | 52 | 19 (Service level D) |
| 01.31 | 08:00:00~08:04:59 | 72 | 14 (Service level C) |
| 02.07 | 08:00:00~08:04:59 | 57 | 19 (Service level D) |
| 02.14 | 08:00:00~08:04:59 | 47 | 25 (Service level E) |
| 02.21 | 08:00:00~08:04:59 | 42 | 25 (Service level E) |
| 02.28 | 08:00:00~08:04:59 | 37 | 25 (Service level E) |

In addition, the speed deriving device 210 may construct the density-speed pattern data in addition to an existing time-speed pattern as shown in Table 3, and calculate the representative speed for each service level. The representative speed may be calculated as an average value of speeds belonging to a specific service level.

TABLE 3

| | TIME | V (Km/h) | Representative speed |
|---|---|---|---|
| [Existing] Time zone unit | 08:00:00~08:04:59 | 64, 69, 59, 57, 42, 47 52, 72, 57, 47, 42, 37 | 53.8 |
| | 08:05:00~08:09:59 | . . . | . . . |
| | Density (veh/km) | V (Km/h) | Representative speed |
| [Improved] Density unit | Service level C | 64, 69, 72 | 68.3 |
| | Service level D | 52, 57, 57, 59 | 56.3 |
| | Service level E | 37, 42, 42, 47, 47 | 43.0 |

As shown in Table 3, based on the data construction by the speed deriving device 210, a speed corresponding to the density rather than an existing speed for each time zone may be calculated, so that a speed based on the vehicle density may be predicted.

The density-speed pattern data of Table 3 may be graphically illustrated.

Figure 5:
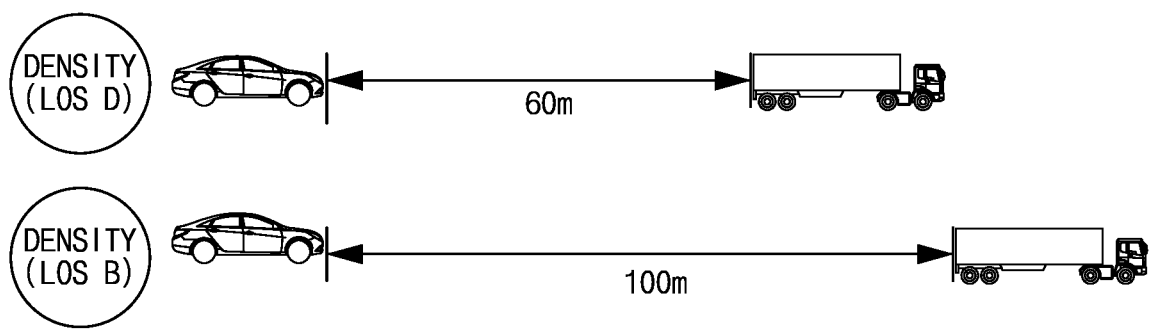
FIG. 5 is a diagram for illustrating a speed-density relationship in one form of the present disclosure.

FIG. 5 is a diagram for illustrating a speed-density relationship in some forms of the present disclosure.

As shown, when the density is the service level D, the distance to the preceding vehicle may be 60 m, and when the density is the service level B, the distance to the preceding vehicle may be 100 m. When a vehicle speed is 60 Km/h in different density situations as described above, the communication situation may be different even though the speed is the same. Because the speed has a large deviation and a difference in the speed occurs based on a propensity of a driver, the traffic condition is not able to be determined with only the speed information. However, even when the driver drives at the same speed, the traffic condition may be identified based on the vehicle density, and the representative speed corresponding to the density may be derived for the specific section.

FIGS. 6A, 6B, 6C and 6D illustrate graphs for illustrating a method for predicting a speed based on a density in some forms of the present disclosure.

The speed predicting device 220 may more accurately predict a speed in a specific time zone by correcting the existing speed using the representative speed calculated by the speed deriving device 210. The speed predicting device 220 may predict a vehicle speed of a current time point based on a pre-constructed time-density pattern, a pre-constructed time-speed pattern, and the density-speed pattern data.

Figure 6A:
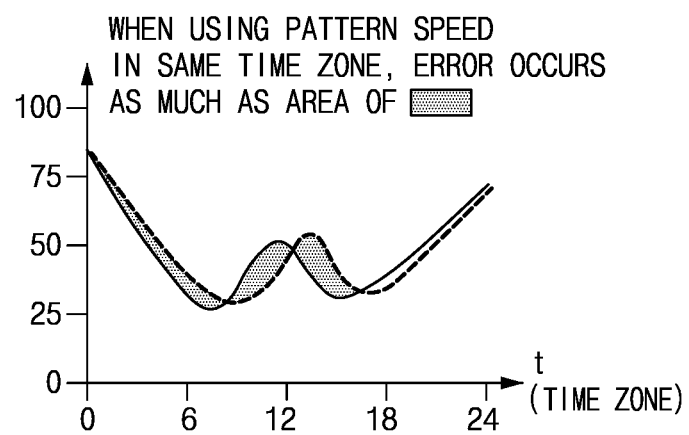
FIGS. 6A, 6B, 6C and 6D illustrate graphs for illustrating a method for predicting a speed based on a density in one form of the present disclosure.

FIG. 6A illustrates an existing time-speed pattern graph of the same time, which uses pattern speeds of the same time zone, so that an error may occur as much as a difference between a real time speed and a past pattern speed, which is as much as a slashed portion in FIG. 6A.

Figure 6B:
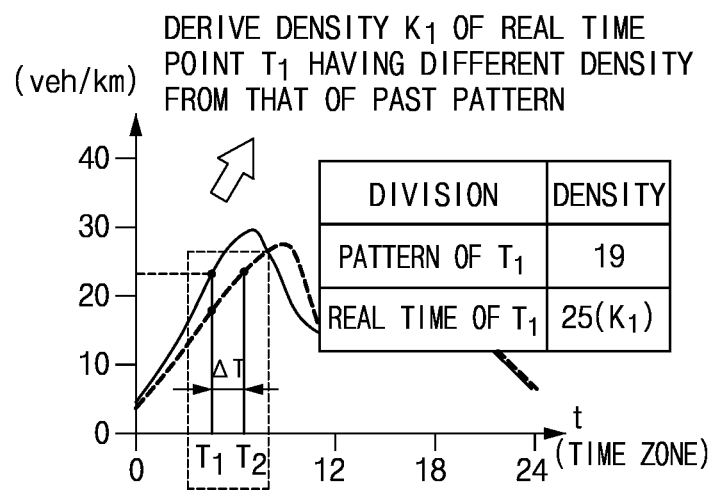

To prevent this, the speed predicting device 220 may derive a real time point T1 at which the density is different from that of the past pattern, and a density K1 corresponding to the real time point T1 from a pre-constructed time-density pattern in FIG. 6B. That is, as shown, it may be seen that a density based on the past pattern at the real time point T1 is 19, but the density is actually 25.

Figure 6C:
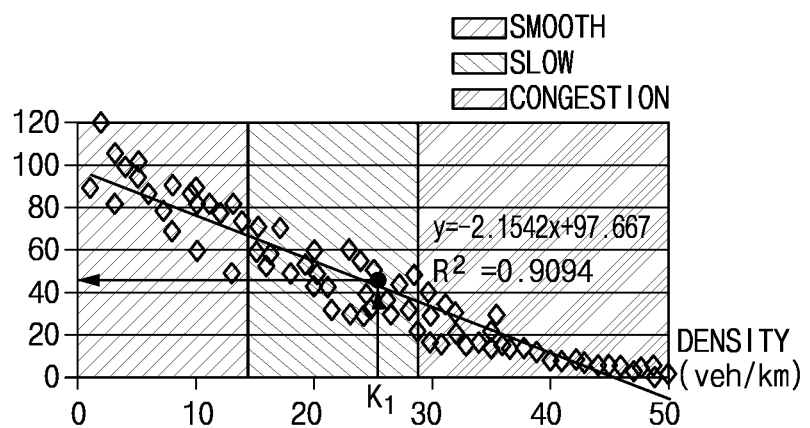

The speed predicting device 220 may derive a speed V1 corresponding to the density 25 using a density-speed pattern graph as shown in FIG. 6C. As in the density-speed graph in FIG. 6C, it may be identified that the traffic condition is smooth when the density is equal to or less than 14, the traffic condition is slow when the density is about between 15 and 29, and the traffic condition is congestion when the density is equal to or greater than 29.

Figure 6D:
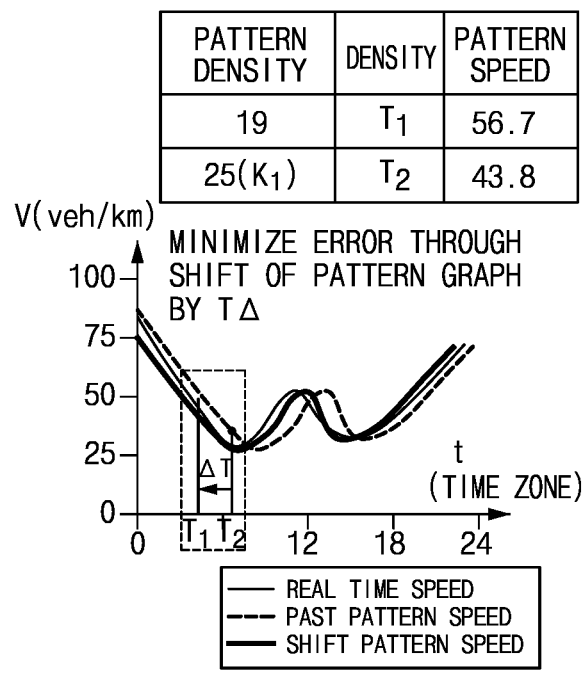

When a speed corresponding to a real time density is derived, the speed predicting device 220 may derive a modified time point corresponding to a speed derived from a time-speed pattern graph as shown in FIG. 6D to correct the speed by shifting the time-speed graph by a difference TΔ between the current time point and the modified time point. Because the time-speed graph is shifted by TΔ, the existing error may be minimized. It may be seen that a speed of the time point at which the density is different from the existing density is corrected from 56.7 to 43.8.

In summary, when the real time density measured in real time does not conform to the time-density pattern, the speed predicting device 220 may derive the first vehicle speed V1 corresponding to the first real time density K1 of the first time point T1 that does not conform to the time-density pattern based on the density-speed pattern data, derive a second time point T2 corresponding to the first vehicle speed V1 from the time-speed pattern, and shift the time-speed pattern by a difference between the second time point T2 and the first time point T1. Because the graph moves to a time corresponding to a speed in which a current vehicle density is reflected, more accurate speed prediction becomes possible.

According to an example, such speed predicting device 220 may include an algorithm for performing deep learning modeling that identifies a relationship between the vehicle density and the speed of the vehicle. That is, the speed predicting device 220 may be implemented with a deep learning algorithm capable of correcting the time-speed pattern by identifying the relationship between the density and the speed.

Figure 7:
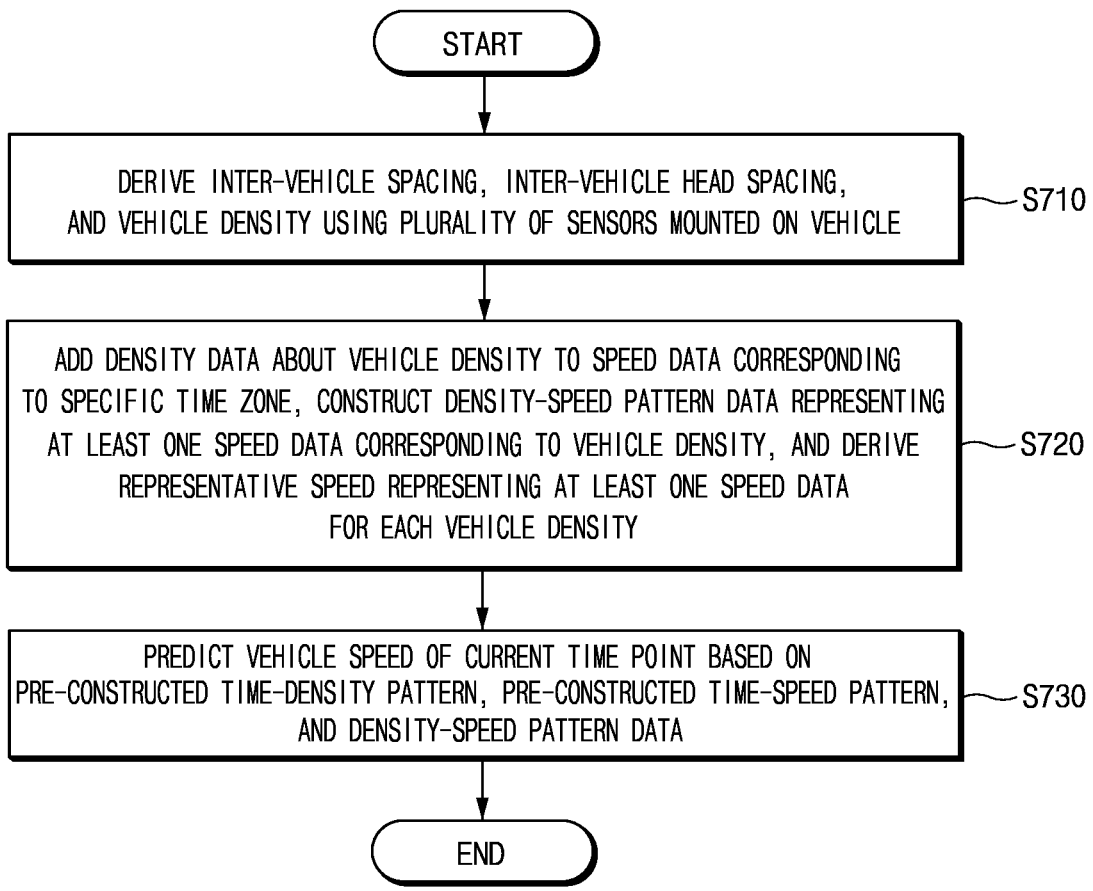
FIG. 7 is a control flowchart illustrating a traffic information predicting method in one form of the present disclosure.

FIG. 7 is a control flowchart illustrating a traffic information predicting method in some forms of the present disclosure. A method for predicting traffic information in some forms of the present disclosure is summarized as follows with reference to FIG. 7.

First, the data calculating device 100 may derive the inter-vehicle spacing, the inter-vehicle head spacing, and the vehicle density using the plurality of sensors mounted on the vehicle (S710).

The inter-vehicle spacing acquiring device 110 may acquire the individual inter-vehicle spacings to the preceding vehicle and to the following vehicle from the front and rear sensors of the vehicle, and the inter-vehicle head spacing calculating device 120 may calculate the inter-vehicle head spacings to the preceding vehicle and to the following vehicle based on the length and the inter-vehicle spacing of the preceding vehicle or the following vehicle acquired by the camera of the vehicle.

The inter-vehicle head spacing calculating device 120 may calculate the inter-vehicle head spacing between the reference vehicle and the preceding vehicle by adding the inter-vehicle spacing to the preceding vehicle to the vehicle length of the preceding vehicle, and may calculate the inter-vehicle head spacing between the reference vehicle and the following vehicle by adding the inter-vehicle spacing to the following vehicle to the vehicle length of the reference vehicle.

In some forms of the present disclosure, the two inter-vehicle spacing data and the two inter-vehicle head spacing data for the three probes are calculated from one probe.

Thereafter, the density calculating device 130 may calculate the vehicle density based on the inter-vehicle head spacing.

Specifically, the density calculating device 130 estimates the average inter-vehicle head spacing of the population based on the N samples of the inter-vehicle head spacings and calculates the vehicle density of the specific section.

When the vehicle density is derived, the speed deriving device 210 may add the density data about the vehicle density to the speed data corresponding to the specific time zone, construct the density-speed pattern data representing the at least one speed data corresponding to the vehicle density, and derive the representative speed representing the at least one speed data for each vehicle density (S720).

The speed predicting device 220 may predict the vehicle speed of the current time point based on the pre-constructed time-density pattern, the pre-constructed time-speed pattern, and the density-speed pattern data (S730).

When the real time density measured in real time does not conform to the time-density pattern, the speed predicting device 220 may derive the first vehicle speed corresponding to the first real time density of the first time point that does not conform to the time-density pattern based on the density-speed pattern data. Thereafter, the speed predicting device 220 may derive the second time point corresponding to the first vehicle speed from the time-speed pattern and shift the time-speed pattern by the difference between the second time point and the first time point, thereby predicting the speed to which the density is reflected.

As described above, the present disclosure reviews a possibility of generation of the density data capable of predicting the traffic condition through a vehicle sensing technology, and proposes a method for overcoming limitations of current traffic information prediction based on the generated density. To this end, the density data was constructed based on vehicle probe data of the vehicle front/rear sensor, the pattern speed with the same density was searched, and a pattern correction logic was developed and applied.

The description above is merely illustrative of the technical idea of the present disclosure, and various modifications and changes may be made by those skilled in the art without departing from the essential characteristics of the present disclosure.

Therefore, some forms of the present disclosure are not intended to limit the technical idea of the present disclosure but to illustrate the present disclosure, and the scope of the technical idea of the present disclosure is not limited by the forms of the present disclosure. The scope of the present disclosure should be construed as being covered by the scope of the appended claims, and all technical ideas falling within the scope of the claims should be construed as being included in the scope of the present disclosure.

In some forms of the present disclosure, provided are the device and the method for predicting the traffic information capable of objectively determining the traffic condition through the inter-vehicle spacing data between the vehicles and generating the additional variable (the density) that may be utilized for the speed prediction.

In addition, in some forms of the present disclosure, provided are the device and the method for predicting the traffic information capable of the reliable density estimation based on the statistical technique.

In addition, in some forms of the present disclosure, provided are the device and the method for predicting the traffic information capable of deriving the travel speed in the same traffic condition by providing the density-based pattern speed.

In addition, in some forms of the present disclosure, provided are the device and the method for predicting the traffic information capable of determining the continuity of the traffic condition based on the current density state and developing the prediction model for the future traffic information.

Therefore, a relationship between the density and the speed may be identified utilizing a deep learning model, not through simple calculation of a travel speed of the same density, and a technology for predicting the travel speed based on real time density data may be advanced utilizing objectivity of a density for each traffic condition.

In addition, various effects that are directly or indirectly identified through this document may be provided.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for predicting traffic information comprising:
    a data calculating device configured to derive inter-vehicle spacings, inter-vehicle head spacings, and a vehicle density using a plurality of sensors mounted on a vehicle; and
    a predicting device configured to:
        derive travel speed data corresponding to the vehicle density; and
        predict the traffic information,
    wherein the data calculating device further comprises:
        an inter-vehicle spacing acquiring device configured to acquire individual inter-vehicle spacings to a preceding vehicle and a following vehicle from a front sensor of the vehicle and a rear sensor of the vehicle among the plurality of sensors;
        an inter-vehicle head spacing calculating device configured to calculate the inter-vehicle head spacing based on a vehicle length of the preceding vehicle or the following vehicle acquired by a camera of the vehicle and the inter-vehicle spacing; and
        a density calculating device configured to calculate the vehicle density based on the inter-vehicle head spacing.

2. The device of claim 1, wherein the inter-vehicle head spacing calculating device is configured to calculate two inter-vehicle spacing data for three probes from one probe.

3. The device of claim 1, wherein the inter-vehicle head spacing calculating device is configured to:
    calculate an inter-vehicle head spacing between the vehicle and the preceding vehicle by adding the inter-vehicle spacing to the preceding vehicle to the vehicle length of the preceding vehicle; and
    calculate an inter-vehicle head spacing between the vehicle and the following vehicle by adding the inter-vehicle spacing to the following vehicle to a vehicle length of the vehicle.

4. The device of claim 1, wherein the density calculating device is configured to:
    estimate an average inter-vehicle head spacing of a population based on N inter-vehicle head spacing samples; and
    calculate a vehicle density of a specific section.

5. The device of claim 4, wherein the density calculating device is configured to:
    calculate the vehicle density of the specific section based on the formula below:

$$\frac{L}{b} \le K \le \frac{L}{a},$$

where K is the density of the specific section, L is a length of the specific section, a is a minimum value of inter-vehicle head spacings µ of the population, and b is a maximum value of the inter-vehicle head spacing µ of the population.

6. The device of claim 1, wherein the predicting device further comprises:
    a speed deriving device configured to:
        add density data about the vehicle density to speed data corresponding to a specific time zone;
        construct density-speed pattern data representing at least one speed data corresponding to the vehicle density; and
        derive a representative speed representing the at least one speed data for each vehicle density.

7. The device of claim 6, wherein the predicting device further comprises:
    a speed predicting device configured to predict a vehicle speed of a current time point based on a pre-constructed time-density pattern, a pre-constructed time-speed pattern, and the density-speed pattern data.

8. The device of claim 7, wherein the speed predicting device is configured to:
    derive a first vehicle speed corresponding to a first real time density of a first time point not conforming to the time-density pattern based on the density-speed pattern data when a real time density measured in real time does not conform to the time-density pattern;
    derive a second time point corresponding to the first vehicle speed from the time-speed pattern; and
    shift the time-speed pattern by calculating a difference between the second time point and the first time point.

9. The device of claim 8, wherein the speed predicting device includes:
    a deep learning model configured to determine a relationship between the vehicle density and the vehicle speed.

10. A method for predicting traffic information, the method comprising:
    deriving, by a data calculating device, inter-vehicle spacings, inter-vehicle head spacings, and a vehicle density using a plurality of sensors mounted on a vehicle; and
    deriving, by a predicting device, travel speed data corresponding to the vehicle density and predicting the traffic information,
    wherein deriving the inter-vehicle spacings, the inter-vehicle head spacings, and the vehicle density comprises:
        acquiring, by an inter-vehicle spacing acquiring device, individual inter-vehicle spacings to a preceding vehicle and a following vehicle from front and rear sensors of the vehicle among the plurality of sensors;
        calculating, by an inter-vehicle head spacing calculating device, the inter-vehicle head spacing based on a vehicle length of the preceding vehicle or the following vehicle acquired by a camera of the vehicle and the inter-vehicle spacing; and
        calculating, by a density calculating device, the vehicle density based on the inter-vehicle head spacing.

11. The method of claim 10, wherein calculating the inter-vehicle head spacing comprises:
    calculating two inter-vehicle spacing data for three probes from one probe.

12. The method of claim 10, wherein calculating the inter-vehicle head spacing comprises:
    calculating an inter-vehicle head spacing between the vehicle and the preceding vehicle by adding the inter-vehicle spacing to the preceding vehicle to the vehicle length of the preceding vehicle; and calculating an inter-vehicle head spacing between the vehicle and the following vehicle by adding the inter-vehicle spacing to the following vehicle to a vehicle length of the vehicle.

13. The method of claim 10, wherein calculating the vehicle density comprises:

estimating an average inter-vehicle head spacing of a population based on N inter-vehicle head spacing samples; and calculating a vehicle density of a specific section.

14. The method of claim 13, wherein calculating the vehicle density of the specific section comprises:

calculating the vehicle density based on the formula below:

$$\frac{L}{b} \leq K \leq \frac{L}{a},$$

where K is the density of the specific section, L is a length of the specific section, a is a minimum value of inter-vehicle head spacings µ of the population, and b is a maximum value of the inter-vehicle head spacing µ of the population.

15. The method of claim 10, wherein predicting the traffic information comprises:

adding, by a speed deriving device, density data about the vehicle density to speed data corresponding to a specific time zone;

constructing, by the speed deriving device, density-speed pattern data representing at least one speed data corresponding to the vehicle density; and deriving, by the speed deriving device, a representative speed representing the at least one speed data for each vehicle density.

16. The method of claim 15, wherein predicting the traffic information comprises:

predicting, by a speed predicting device, a vehicle speed of a current time point based on a pre-constructed time-density pattern, a pre-constructed time-speed pattern, and the density-speed pattern data.

17. The method of claim 16, wherein predicting the traffic information comprises:

deriving a first vehicle speed corresponding to a first real time density of a first time point not conforming to the time-density pattern based on the density-speed pattern data when a real time density measured in real time does not conform to the time-density pattern;

deriving a second time point corresponding to the first vehicle speed from the time-speed pattern; and shifting the time-speed pattern by calculating a difference between the second time point and the first time point.

18. The method of claim 17, wherein predicting the traffic information comprises:

performing deep learning modeling that is configured to determine a relationship between the vehicle density and the vehicle speed.

\* \* \* \* \*